D. WILCOX.

Fifth Wheel for Carriages.

No. 93,261.

Patented Aug. 3, 1869.

Witnesses

Inventor

United States Patent Office.

DARIUS WILCOX, OF BIRMINGHAM, ASSIGNOR TO HIMSELF AND WARREN WILCOX, OF ANSONIA, CONNECTICUT.

Letters Patent No. 93,261, dated August 3, 1869.

IMPROVEMENT IN FIFTH-WHEELS FOR CARRIAGES.

The Schedule referred to in these Letters Patent and making part of the same.

*To all whom it may concern:*

Be it known that I, DARIUS WILCOX, of Birmingham, in the county of New Haven, and State of Connecticut, have invented a new Improvement in Fifth-Wheel for Carriages; and I do hereby declare the following, when taken in connection with the accompanying drawings, and the letters of reference marked thereon, to be a full, clear, and exact description of the same, and which said drawings constitute part of this specification, and represent, in—

Figure 1:
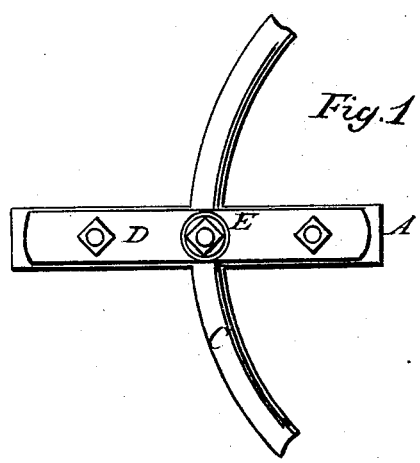
Figure 2:
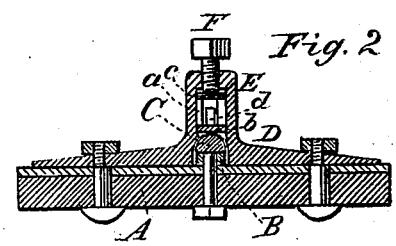

Figure 1, a top view,

Figure 2, a central section, and in

Figure 3:
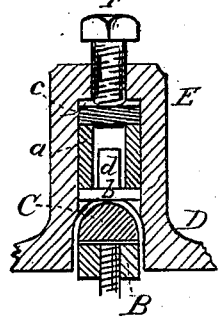

Figure 3, a sectional view of the head, enlarged.

This invention relates to an improvement in the connection of the fifth-wheel to the perch, the chief object being to prevent rattling; and The invention consists in the arrangement of a yoke upon the perch, so as to cover the fifth-wheel, the said yoke enclosing an India-rubber spring, with a hardened-steel head, bearing upon the perch, and having combined therewith a set-screw to adjust the springs, so that the fifth-wheel may be bound together with sufficient pressure to prevent its rattling, so as to move freely.

To enable others skilled in the art to make and use my invention, I will proceed to describe the same, as illustrated in the accompanying drawings.

A is the perch.

B, the fixed part of the fifth-wheel, securely attached to the perch.

C is the fifth-wheel, arranged so as to turn upon the part B in the usual manner.

Upon the perch is fixed a yoke, D, which passes over the fifth-wheel, and is there formed into a head, E, as seen in fig. 2, the said head being recessed, so as to receive an India-rubber spring, $a$, the spring being of tubular form, so as to receive the shank $d$ of the plate $b$, which bears upon the fifth-wheel, as seen in fig. 2.

The plate $b$ is made from steel, hardened. Through the head a set-screw, F, is arranged, which bears upon a plate, $c$, so that the power of the spring may be adjusted by the turning of the set-screw.

I do not wish to be understood as broadly claiming the arrangement of an India-rubber spring upon a fifth-wheel to prevent rattling; but What I do claim as my invention, and desire to secure by Letters Patent, is—

1. The tubular spring $a$, arranged within the head E of the yoke D, with the hardened-steel plate $b$, bearing upon the fifth-wheel C, as set forth.

2. In combination with the above, the adjusting-screw F, with its plate C, substantially as described.

DARIUS WILCOX.

Witnesses:
JOHN H. SHUMWAY,
A. J. TIBBITS.